United States Patent
Lin et al.

(10) Patent No.: US 11,747,449 B2
(45) Date of Patent: Sep. 5, 2023

(54) SCANNING UNIT OF AN OPTICAL TRANSMISSION AND RECEIVING DEVICE OF AN OPTICAL DETECTION APPARATUS OF A VEHICLE

(71) Applicant: Valeo Schalter und Sensoren GmbH, Bietigheim-Bissingen (DE)

(72) Inventors: Lin Lin, Bietigheim-Bissingen (DE); Peter Horvath, Bietigheim-Bissingen (DE); Thomas Schuler, Bietigheim-Bissingen (DE); Ho Hoai Duc Nguyen, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 1195 days.

(21) Appl. No.: 16/338,241

(22) PCT Filed: Sep. 29, 2017

(86) PCT No.: PCT/EP2017/074749
§ 371 (c)(1),
(2) Date: Mar. 29, 2019

(87) PCT Pub. No.: WO2018/060408
PCT Pub. Date: Apr. 5, 2018

(65) Prior Publication Data
US 2019/0235057 A1    Aug. 1, 2019

(30) Foreign Application Priority Data

Sep. 29, 2016  (DE) .................... 10 2016 118 481.0

(51) Int. Cl.
*G01S 7/481* (2006.01)
*G01S 17/42* (2006.01)
(Continued)

(52) U.S. Cl.
CPC .......... *G01S 7/4814* (2013.01); *G01S 7/4817* (2013.01); *G01S 17/42* (2013.01); *G01S 17/931* (2020.01);
(Continued)

(58) Field of Classification Search
CPC ...... G01S 7/4814; G01S 17/42; G01S 7/4817; G01S 17/931; G01S 7/4811; B60W 50/0098; G02F 1/29
See application file for complete search history.

(56) References Cited

U.S. PATENT DOCUMENTS 6,301,003 B1    10/2001   Shirai et al.
2007/0219720 A1*  9/2007  Trepagnier ............ G01S 17/931
                                                                              701/300
2009/0059766 A1   3/2009   Yamada

FOREIGN PATENT DOCUMENTS

DE    4007646 A1    9/1991
DE    10227299 A1   1/2004
(Continued)

OTHER PUBLICATIONS

Office Action issued in European Patent Application No. 17 781 055.3, dated May 26, 2020 (15 pages).
(Continued)

*Primary Examiner* — Tsion B Owens
(74) *Attorney, Agent, or Firm* — Osha Bergman Watanabe & Burton LLP (57) ABSTRACT

Described are a mechanical scanning unit (32) of an optical transmission and receiving device of an optical detection apparatus of a vehicle, an optical transmission and receiving device, an optical detection apparatus, a driver assistance device and a vehicle. The scanning unit (32) comprises at least one first beam influencing device (42) for deflecting at least one light beam (38), which has been radiated into the scanning unit (32), in a first direction (y) and at least one (Continued)

second beam influencing device (44) for changing a beam propagation of the at least one light beam (38) in a second direction (z). The at least one second beam influencing device (44) is arranged in the beam path of the at least one light beam (38) downstream of the at least one first beam influencing device (42). The first direction (y) and the second direction (z) extend perpendicularly or at an angle with respect to one another. The at least one second beam influencing device (44) has at least one optical lens for expanding the at least one light beam (38) in the second direction (z).

2 Claims, 3 Drawing Sheets

(51) Int. Cl.
　　*G01S 17/931*　　(2020.01)
　　*B60W 50/00*　　(2006.01)
　　*G02F 1/29*　　(2006.01)

(52) U.S. Cl.
　　CPC ........ *B60W 50/0098* (2013.01); *G01S 7/4811* (2013.01); *G02F 1/29* (2013.01)

(56) References Cited

FOREIGN PATENT DOCUMENTS

| | | |
|---|---|---|
| DE | 102011007243 A1 | 10/2012 |
| EP | 1411371 A1 | 4/2004 |
| JP | 108248131 A | 9/1996 |
| WO | 2005/069939 A2 | 8/2005 |
| WO | 2014/200581 A2 | 12/2014 |

OTHER PUBLICATIONS

German Search Report in corresponding German Application No. 10 2016 118 481.0, dated May 16, 2017 (5 pages).

International Search Report and Written Opinion in corresponding International Application No. PCT/EP2017/074749, dated Jan. 25, 2018 (14 pages).

* cited by examiner

SCANNING UNIT OF AN OPTICAL TRANSMISSION AND RECEIVING DEVICE OF AN OPTICAL DETECTION APPARATUS OF A VEHICLE

TECHNICAL FIELD

The invention relates to a scanning unit of an optical transmission and receiving device of an optical detection apparatus of a vehicle, having at least one first beam influencing device for deflecting at least one light beam, which is radiated into the scanning unit, in a first direction and having at least one second beam influencing device for changing a beam propagation of the at least one light beam in a second direction, wherein the at least one second beam influencing device is arranged in the beam path of the at least one light beam downstream of the at least one first beam influencing device, wherein the first direction and the second direction extend perpendicularly or at an angle with respect to one another.

The invention furthermore relates to an optical transmission and receiving device of an optical detection apparatus of a vehicle, having at least one optical transmitter for transmitting at least one transmission light beam, at least one scanning unit at least for changing the beam direction of the at least one transmission light beam and at least one optical receiver for receiving at least one reception light beam, which are arranged relative to one another such that the at least one receiver can receive transmission light beams, which have been transmitted by the at least one transmitter and are reflected back by an object or obstacle which may be present in a transmission beam path of the at least one transmitter as reception light beams, wherein the at least one scanning unit has at least one first beam influencing device for deflecting at least one transmission light beam, which has been radiated into the at least one scanning unit by the at least one transmitter, in a first direction and at least one second beam influencing device for changing a beam propagation of the at least one transmission light beam in a second direction, wherein the at least one second beam influencing device is arranged in the beam path of the at least one transmission light beam downstream of the at least one first beam influencing device, wherein the first direction and the second direction extend perpendicularly or at an angle with respect to one another.

The invention moreover relates to an optical detection apparatus of a vehicle, having at least one optical transmission and receiving device and at least one electronic control and/or evaluation device for controlling the at least one optical transmission and receiving device and for evaluating measurements performed using the detection apparatus, wherein the at least one transmission and receiving device has at least one optical transmitter for transmitting at least one transmission light beam, at least one scanning unit at least for changing the beam direction of the at least one transmission light beam and at least one optical receiver for receiving at least one reception light beam, which are arranged relative to one another such that the at least one receiver can receive transmission light beams, which have been transmitted by the at least one transmitter and are reflected back by an object or obstacle which may be present in a transmission beam path of the at least one transmitter as reception light beams, wherein the at least one scanning unit has at least one first beam influencing device for deflecting at least one transmission light beam, which has been radiated into the at least one scanning unit by the at least one transmitter, in a first direction and at least one second beam influencing device for changing a beam propagation of the at least one transmission light beam in a second direction, wherein the at least one second beam influencing device is arranged in the beam path of the at least one transmission light beam downstream of the at least one first beam influencing device, wherein the first direction and the second direction extend perpendicularly or at an angle with respect to one another.

The invention additionally relates to a driver assistance system of a vehicle having at least one optical detection apparatus and at least one electronic control device, which is or can be connected in a control-technological or regulation-technological manner to the at least one detection apparatus and also to corresponding function devices of the vehicle, wherein the at least one detection apparatus has at least one optical transmission and receiving device and at least one electronic control and/or evaluation device for controlling the at least one optical transmission and receiving device and for evaluating measurements performed using the detection apparatus, wherein the at least one transmission and receiving device has at least one optical transmitter for transmitting at least one transmission light beam, at least one scanning unit at least for changing the beam direction of the at least one transmission light beam and at least one optical receiver for receiving at least one reception light beam, which are arranged relative to one another such that the at least one receiver can receive transmission light beams, which have been transmitted by the at least one transmitter and are reflected back by an object or obstacle which may be present in a transmission beam path of the at least one transmitter as reception light beams, wherein the at least one scanning unit has at least one first beam influencing device for deflecting at least one transmission light beam, which has been radiated into the at least one scanning unit by the at least one transmitter, in a first direction and at least one second beam influencing device for changing a beam propagation of the at least one transmission light beam in a second direction, wherein the at least one second beam influencing device is arranged in the beam path of the at least one transmission light beam downstream of the at least one first beam influencing device, wherein the first direction and the second direction extend perpendicularly or at an angle with respect to one another.

The invention finally relates to a vehicle having at least one optical detection apparatus, in particular a driver assistance system, wherein the at least one optical detection apparatus has at least one optical transmission and receiving device and at least one electronic control and/or evaluation device for controlling the at least one optical transmission and receiving device and for evaluating measurements performed using the detection apparatus, wherein the at least one transmission and receiving device has at least one optical transmitter for transmitting at least one transmission light beam, at least one scanning unit at least for changing the beam direction of the at least one transmission light beam and at least one optical receiver for receiving at least one reception light beam, which are arranged relative to one another such that the at least one receiver can receive transmission light beams, which have been transmitted by the at least one transmitter and are reflected back by an object or obstacle which may be present in a transmission beam path of the at least one transmitter as reception light beams, wherein the at least one scanning unit has at least one first beam influencing device for deflecting at least one transmission light beam, which has been radiated into the at least one scanning unit by the at least one transmitter, in a first direction and at least one second beam influencing device for changing a beam propagation of the at least one transmission light beam in a second direction, wherein the at least one second beam influencing device is arranged in the beam path of the at least one transmission light beam downstream of the at least one first beam influencing device, wherein the first direction and the second direction extend perpendicularly or at an angle with respect to one another.

PRIOR ART

It is known from WO 2014/200581 A2 to connect a continuously acting beam direction structural element, which comprises a compact liquid crystal waveguide, to a polarization grating (PG) to provide an electrooptical beam director. Horizontal beam direction is achieved using prism-type electrodes having a refractive index that can be tuned by way of electrical voltage. Vertical beam direction is achieved by way of tunnelling of the evanescent field into a substrate having a high refractive index.

The invention is based on the object of designing a scanning device, an optical transmission and receiving device, an optical detection apparatus, a driver assistance device and a vehicle of the type mentioned in the introductory part, in which as large a field of view as possible in the first, in particular horizontal, direction and the second, in particular vertical, direction can be realized as easily as possible with the smallest possible power losses.

DISCLOSURE OF THE INVENTION

This object is achieved according to the invention in the scanning unit by way of the at least one second beam influencing device having at least one optical lens for expanding the at least one light beam in the second direction.

According to the invention, the scanning unit has at least one first beam influencing device with which the beam direction of the at least one light beam is deflected only in the first direction. The second beam influencing device has at least one optical lens with which the light beam is expanded in the second direction. The monitoring region is thus scanned only in the first direction.

The at least one first beam influencing device can be used to pan the light beam in the first direction and in this way to scan the monitoring region. In this way, a relatively large field of view can be scanned in the first direction. The field of view is also referred to as FoV. The first beam influencing device can be used to scan fields of view having an opening angle in the first direction of up to 270° and more.

The at least one second beam influencing device is used to merely expand the light beam in the second direction. Additional panning in the second direction can in this way be dispensed with. In this way, fields of view in the second direction with opening angles of up to 20° and more can be captured. By comparison, the fields of view in the second direction in the transmitter known from the prior art are limited to 5°. Moreover, in contrast to the transmitter known from the prior art, it is not necessary according to the invention to use settable prism couplers, in particular what are known as Ulrich couplers, in which high insertion losses of up to 6 dB can be effected due to diced wafers. In this way, the insertion loss can be reduced in the solution according to the invention. Furthermore, no complex manufacturing processes such as what is known as "dicing" and/or "tapering" at the output are necessary, as is the case in the transmitter known from the prior art. In addition, the limitation of the field of view in the first direction, in particular the vertical field of view, of the transmitter device known from the prior art can be overcome. Furthermore, for example no third electrode for moving the light beam in the second direction is required in the solution according to the invention.

Overall, it is possible with the invention to realize an optical transmission device that produces the greatest possible field of view in the first, in particular horizontal, direction, in particular plane, and in the second, in particular vertical, direction, in particular plane, causes low power losses and at the same time can be realized cost-effectively.

Advantageously, a focal length (F#) and/or an optical design of the at least one second beam influencing device can be prescribed and/or settable. In this way, an opening angle in the second direction can be correspondingly prescribed and/or set.

Advantageously, the field of view can be scanned by the at least one first beam influencing device in the first direction with 1500 steps with a resolution of 0.1°. In this way, an opening angle in the first direction, in particular a horizontal viewing angle, of approximately 150° can be covered. With each scanning step, the entire field of view in the second direction, in particular the vertical viewing angle, can be illuminated with the expanded light beam.

Advantageously, the light source can operate according to a pulse method. With each scanning step of the at least one first beam influencing device, a light pulse can be radiated into the scanning device and be deflected and expanded thereby accordingly. The light pulse can illuminate the entire field of view in the second direction in the case of the corresponding deflection angle of the light beam in the first direction. The light pulse can advantageously have a length in the nanosecond range. In this way, a correspondingly fast scanning of the entire field of view can be performed. Advantageously, the light pulse can be an ns laser pulse.

At least one light beam, which is deflected by the scanning unit, expanded, and reflected by an object or obstacle, can advantageously be detected using at least one spatially and/or angle-resolving optical receiver. In this way, a two-dimensional spatial and/or angle resolution of the field of view can be attained.

Advantageously, a resolution of reflected light cones in the second direction can be defined by an angle-resolving optical receiver on the receiver side. The light cones have, due to their expansion in the second direction, an elliptical base area, the long transverse axis of which is parallel to the second direction, in particular vertical.

Advantageously, the at least one optical receiver can have a multiplicity of image points (pixels) which are located, viewed in the first direction, one next to the other. In this way, a corresponding spatial resolution can be achieved in the first direction. With this spatial resolution, a corresponding angle resolution can be achieved. The light reflected by an object or obstacle can thus be collected using the at least one optical receiver and be resolved via the image points according to the direction of origin thereof.

Advantageously, the at least one optical receiver can have at least 200 image points, viewed in the first direction. In this way, sufficiently good angle resolution is realizable.

Advantageously, the first direction and the second direction can extend perpendicularly to one another. In this way, good separation of the directions and thus scanning of a correspondingly large monitoring region can be effected.

Advantageously, the first direction in the normal operation orientation of the scanning unit can extend spatially horizontally. The first beam influencing device can thus deflect the light beam in the horizontal direction. In this way, a correspondingly large field of view in the horizontal direction can be monitored. A correspondingly large environment field of the vehicle can thus be monitored.

Advantageously, the second direction in the normal operation orientation can extend spatially vertically. In this way, the environment field of the vehicle can be monitored up to a height defined by the opening angle in the second direction, in particular from a road up to the height of the vehicle.

Advantageously, the scanning device can be embodied for deflecting and/or changing coherent light beams, in particular laser beams. Coherent light beams can be used to ascertain a propagation time in particular of pulsed light beams more accurately.

Advantageously, the at least one light beam can be slightly divergent upon entry into the scanning unit. In this way, a corresponding opening angle can already be realized with the light beam. The slightly divergent light beam can be expanded further with the at least one second beam influencing device.

Advantageously, the at least one light beam of a light source can be introduced into the scanning unit by way of a light guide, in particular a waveguide. In this way, the light source can also be arranged at a distance from the scanning unit.

Advantageously, the at least one first beam influencing device and/or the at least one second beam influencing device, in particular the entire scanning unit, made up of in particular optical structural elements can be embodied and/or constructed such that, during operation of the scanning unit, as few structural elements used as possible, in particular none of them, need to be moved entirely or partially. In this way, the structural elements used, in particular the entire scanning unit, can have a great stability and durability.

Advantageously, the detection apparatus can be a laser-based distance measurement system. The laser-based distance measurement system has, as the light source of the at least one transmitter, at least one laser, in particular a diode laser. The at least one laser can be used to transmit in particular pulsed transmission beams as transmission signals. The laser can be used to emit transmission signals in frequency ranges which are visible or not visible to the human eye. Accordingly, at least one receiver can include a receiver that is designed for the frequency of the transmitted light. The laser-based distance measurement system can advantageously be a laser scanner. A laser scanner can be used to scan a monitoring region with an in particular pulsed laser beam in a field of view.

Advantageously, the at least one detection apparatus can operate in accordance with a time-of-flight method. Optical detection apparatuses operating in accordance with the light pulse time-of-flight method can be embodied and referred to as time-of-flight (TOF), light detection and ranging systems (LiDAR), laser detection and ranging systems (LaDAR) or the like. Here, a time of flight from transmission of a transmission signal, in particular a light pulse, using at least one transmitter and receipt of the corresponding reflected reception signal using at least one receiver is measured, and the distance between the detection apparatus and the detected object or obstacle is ascertained therefrom.

The invention is used in a vehicle, in particular a motor vehicle. The invention can advantageously be used in a land-based vehicle, in particular a passenger vehicle, a lorry, a bus, a motorcycle or the like, a vessel, an aircraft, or a combined land, water and/or air vehicle. The invention can also be used in autonomous, or at least partially autonomous, vehicles.

Advantageously, the optical detection apparatus can be part of a driver assistance system of a vehicle or be connected thereto. The signals of the optical detection apparatus can be used for controlling function components of the vehicle. The function components can be used to control in particular driving functions and/or signalling devices of the vehicle, in particular steering, a brake system and/or an engine. For example, if an object or obstacle is detected using the optical detection apparatus, the corresponding function components can be used to steer the vehicle and/or change the speed thereof, in particular stop it, and/or output at least one signal.

Alternatively or additionally, the optical detection apparatus can preferably be part of a chassis control system of a vehicle or be connected thereto. The chassis control system can be used to adapt a chassis of the vehicle to a road. The chassis control system can be used to control an active suspension or an active chassis. For example, if an object or obstacle, in particular an elevation on or a dip in the road, is detected using the optical detection apparatus in a monitoring region monitored with the field of view, the chassis, in particular the suspension, can be correspondingly adapted. The chassis control system can be used to actively prepare the chassis for a coming situation, in particular unevennesses in the road.

In an advantageous embodiment, at least one first beam influencing device can have at least one electro-optical light refraction device, or consist thereof. In this way, the beam direction of the at least one light beam can be changed more directly in an electrical manner.

Advantageously, the at least one first beam influencing device can have at least one liquid-crystal waveguide, with which the light beam can be controlled by electro-optical refraction.

Advantageously, at least one first beam influencing device can be embodied such that it can be used to scan the monitoring region in one direction, in particular the first direction, one-dimensionally, as it were. With the addition according to the invention of at least one optical lens in the beam path of the light beam downstream of the one-dimensionally acting at least one first beam influencing device, it is not necessary for the at least one first beam influencing device to likewise scan the second direction. That is to say, at least one first two-dimensionally acting beam influencing device can be dispensed with.

In a further advantageous embodiment, the at least one second beam influencing device can have, or consist of, at least one planoconcave lens, at least one planoconvex lens, at least one concave-concave lens, at least one convex-convex lens and/or at least one concave-convex lens. Lenses which are convex or concave at least on one side can be used to effect a corresponding expansion of the light beam. Using concave lenses, the light beam can be correspondingly expanded without inverting the image. Using convex lenses, the obtained image can be inverted. This can be taken into account in particular in the data processing on the receiver side.

Advantageously, an opening angle of the light beam can be enlarged with a concave and/or convex lens. Depending on the focal length (F#) and optical design of the at least one lens, opening angles of 20° and more can be achieved.

In a further advantageous embodiment, the at least one second beam influencing device can have at least one cylindrical lens, or consist thereof. Using a cylindrical lens, a light beam can be expanded in the direction perpendicular to an imaginary cylinder axis of the cylindrical lens. In contrast, no expansion of the light beam occurs in the direction in which the imaginary cylinder axis extends. The cylindrical lens can be oriented such that its imaginary cylinder axis extends parallel to the first direction. In this way, the expansion of the light beam occurs only in the second direction.

Advantageously, an opening angle of the light beam can be enlarged in only one direction with a concave and/or convex cylindrical lens.

In a further advantageous embodiment, an opening angle of the field of view in the first direction can be at least approximately 150°, in particular up to approximately 270° and more.

Advantageously, the opening angle can be scanned in the first direction using the scanning unit in steps of 0.1°. In this way, a correspondingly large angle resolution in the first direction can be achieved.

Advantageously, with each scanning step, the field of view defined by the beam direction can be scanned in its entire extent in the second direction. In this way, a faster scanning of the entire monitoring region can be performed.

For laser scanners, an angle resolution of 0.1° will be necessary in future. The field of view in the first direction must here have an opening angle of at least 150°. The field of view in the second direction must herefor have an opening angle of at least 20°. To attain this, scanners known from the prior art would have to scan at least 200 steps to completely cover the field of view in the second direction. Known scanners, in particular with two-dimensional microelectromechanical mirrors (MEMS) and two-dimensional SEEOR, are here limited with respect to a scanning frequency and the field of view in the second direction.

The technical object is furthermore achieved according to the invention in the optical transmission and receiving device by way of the at least one second beam influencing device having at least one optical lens for expanding the at least one transmission light beam in the second direction.

In an advantageous embodiment, the transmission and receiving device can have at least one angle-resolving and/or spatially resolving optical receiver. The at least one angle-resolving and/or spatially resolving optical receiver can be used to detect the reception light beam in a spatially resolved and/or angle-dependent manner. For example, the direction from which the reception light beam is coming, and in which accordingly a corresponding object or obstacle is located, can be determined.

Advantageously, at least one angle-resolving and/or spatially resolving optical receiver can have at least one two-dimensional radiation sensor having a multiplicity of two-dimensionally arranged reception image points. In this way, two-dimensional spatial resolution can be realized.

Advantageously, the at least one receiver can have at least one what is known as a focal plane array (FPA), in particular on the basis of CCD technology, CMOS technology or the like. Light signals can be converted into electrical signals thereby. Electrical signals can be evaluated with a corresponding electronic evaluation unit.

Moreover, the technical object is achieved in the optical detection apparatus by way of the at least one second beam influencing device having at least one optical lens for expanding the at least one transmission light beam in the second direction.

In addition, the technical object is achieved in the driver assistance device by way of the at least one second beam influencing device having at least one optical lens for expanding the at least one transmission light beam in the second direction.

Finally, the technical object is achieved according to the invention in the vehicle by way of the at least one second beam influencing device having at least one optical lens for expanding the at least one transmission light beam in the second direction.

In addition, the features and advantages indicated in connection with the scanning device according to the invention, the transmission and receiving device according to the invention, the detection apparatus according to the invention, the driver assistance device according to the invention and the vehicle according to the invention and the respective advantageous configurations thereof apply here in a mutually corresponding manner and vice versa. The individual features and advantages can of course be combined with one another, wherein further advantageous effects can occur that go beyond the sum of the individual effects.

BRIEF DESCRIPTION OF THE DRAWINGS

Further advantages, features and details of the invention are apparent from the following description, in which an exemplary embodiment of the invention will be explained in more detail with reference to the drawing. A person skilled in the art will also expediently consider individually the features which have been disclosed in the drawing, the description and the claims in combination and combine them to form further meaningful combinations. In the figures, FIG. 1 schematically shows a motor vehicle in front view, having a driver assistance system with a laser scanner;

In the figures, identical structural elements are provided with the same reference numerals.

EMBODIMENT(S) OF THE INVENTION

Figure 1:
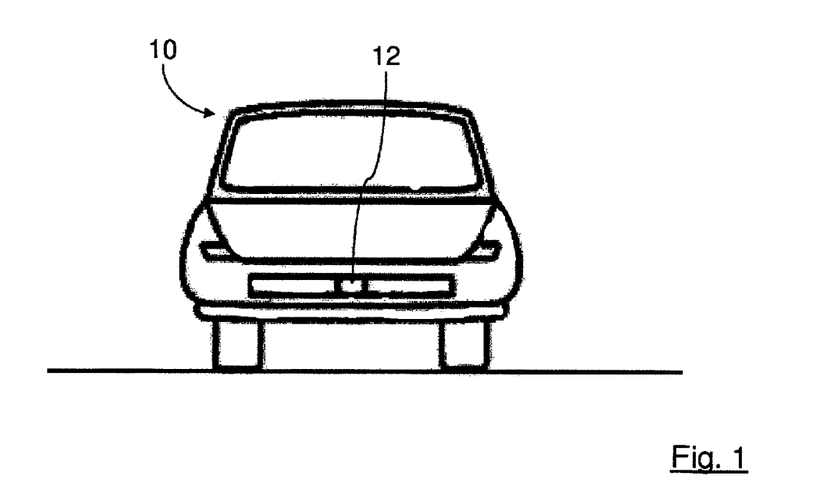
Figure 2:
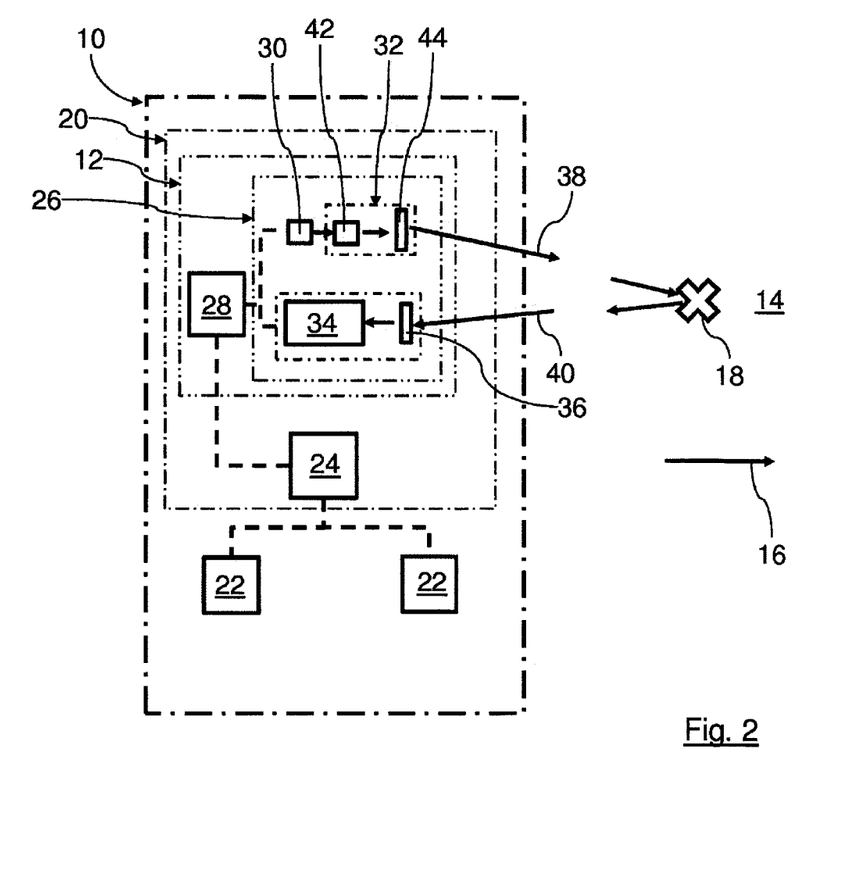
FIG. 2 schematically shows a functional diagram of the motor vehicle with the driver assistance system from FIG. 1.

FIG. 1 illustrates a motor vehicle 10 in the form of a passenger vehicle in front view. The motor vehicle 10 has an optical detection apparatus in the form of a laser scanner 12. The laser scanner 12 is arranged by way of example in the front bumper of the motor vehicle 10. The laser scanner 12 can be used to monitor a monitoring region 14 in the driving direction 16 in front of the motor vehicle 10 for objects 18. The objects 18 can be, for example, other vehicles or other obstacles. In FIG. 2, an object 18 is indicated by way of example as a cross. For the remainder, FIG. 2 is merely a function diagram of some of the structural elements of the motor vehicle 10, which does not serve for spatial orientation.

The laser scanner 12 operates in accordance with a light pulse time-of-flight method. It can be used to ascertain a distance and a direction of the object 18 relative to the motor vehicle 10.

The laser scanner 12 is part of a driver assistance system 20. The driver assistance system 20 can be used to support a driver of the motor vehicle 10. For example, the motor vehicle 10 can drive at least partially autonomously using the driver assistance system 20. The driver assistance system 20 can be used to influence driving functions of the motor vehicle 10, for example engine control, a braking function, or a steering function, or to output notices or warning signals. To this end, the driver assistance system 20 is connected in a regulating and/or controlling fashion to function devices 22. FIG. 2 illustrates by way of example two function devices 22. The function devices 22 can be, for example, an engine control system, a brake system, a steering system, a chassis control system or a signal output system.

The driver assistance system 20 includes an electronic control device 24, with which corresponding electronic control and regulation signals can be transmitted to the function devices 22 and/or be received and processed thereby.

The laser scanner 12 comprises a transmission and receiving device 26 and an electronic control and evaluation device 28. The transmission and receiving device 26 comprises a transmitter 30, for example in the form of a laser diode having an optical waveguide, a scanning unit 32 and a receiver 34, for example in the form of a two-dimensional CCD array, with a corresponding receiver optical unit 36.

The transmitter 30 can be used to transmit pulsed optical transmission signals 38 via the scanning unit 32 into the monitoring region 14. The transmission signals 38 are reflected at the object 18 and sent back to the laser scanner 12 in the form of correspondingly pulsed optical reception signals 40. The distance of the object 18 is ascertained by the control and evaluation device 28 from the time of flight, that is to say from the time between the transmission of a transmission signal 32 and the receipt of the corresponding reception signal 34.

FIGS. 3 to 6 show, for the purposes of better orientation, an imaginary orthogonal x-y-z coordinate system. The x-y-plane extends spatially horizontally in the normal operation orientation of the motor vehicle 10 and of the laser scanner 12. The z-axis extends spatially vertically. The illustrations in FIGS. 3 to 6, for the purposes of better clarity, are otherwise not to scale and not conformal.

Figure 3:
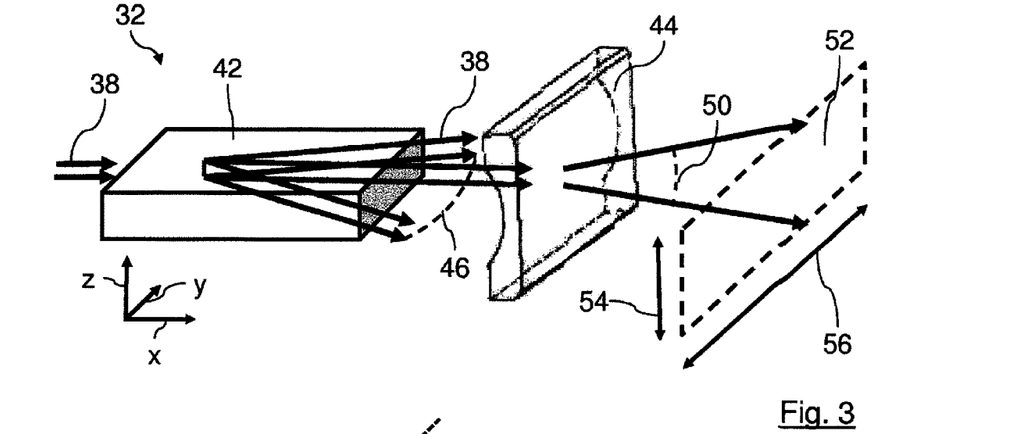
FIG. 3 schematically shows an isometric illustration of a scanning unit of the laser scanner of the motor vehicle from FIGS. 1 and 2.
Figure 4:
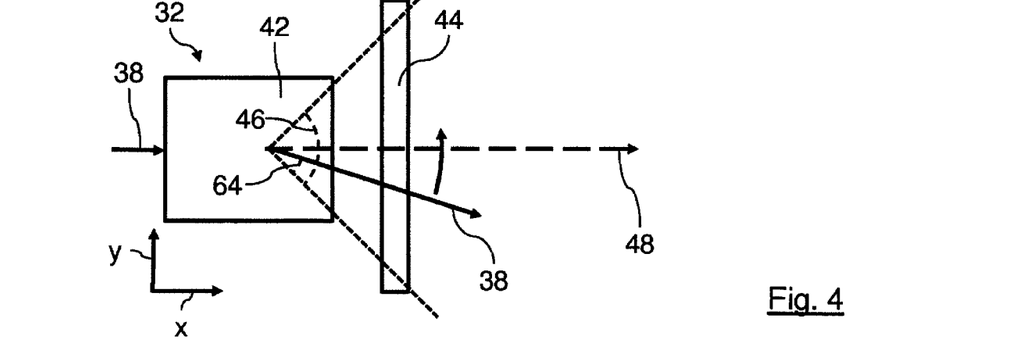
FIG. 4 schematically shows a plan view of the scanning unit from FIG. 3 in a vertical observation direction.
Figure 5:
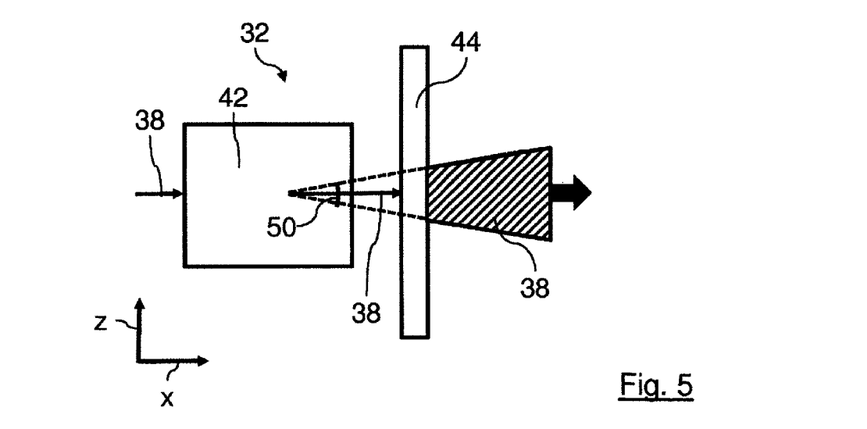
FIG. 5 schematically shows a side view of the scanning unit from FIGS. 3 and 4 in a horizontal observation direction.

The scanning unit 32 has a first beam influencing device 42, for example with a compact liquid-crystal waveguide, and a second beam influencing device in the form of an optical concave-planar cylindrical lens 44.

Using the first beam influencing device 42, the transmission signals 32, or the central emission direction of the transmission signals 32, are deflected in a first direction, that is to say in a dimension, as it were. In the exemplary embodiment shown, the first direction extends, for example, horizontally, that is to say in the direction of the y-axis. The first direction will therefore be referred to below for short, for the sake of simplicity, as the "direction of the y-axis". The first beam influencing device 42 is settable in correspondence with the transmitter 28 with respect to the deflection thereof in the direction of the y-axis. In this way, an emission direction of the transmission signals 32 is changed in the direction of the y-axis. The beam guidance in the direction of the y-axis is achieved in the case of the first beam influencing device 42 for example by way of prism-type electrodes, the refractive index of which can be tuned by electrical voltage. With the first beam influencing device 42, an opening angle 46 of approximately 150°, for example, indicated in FIG. 4, can be scanned in a plane with the y-axis with a resolution of 0.1° in 1500 scanning steps.

A main monitoring direction 46 corresponds to a central setting of the first beam influencing device 42. The main monitoring direction 46 in the exemplary embodiment shown extends parallel to the x-axis. Generally, the main monitoring direction 46, in the case of a straight steering angle, is oriented in the driving direction 16 of the motor vehicle 10.

The cylindrical lens 44 is located in the beam path of the transmission signals 38 downstream of the first beam influencing device 42. The concave side of the cylindrical lens 44 faces the first beam influencing device 42. An imaginary cylinder axis of the cylindrical lens 44 extends parallel to the y-axis, that is to say for example spatially horizontally. The planar side of the cylindrical lens 44 extends perpendicularly to the x-axis. The cylindrical lens 44 is used to expand the beams of the transmission signals 32 in a second direction by an expansion angle 50 indicated in FIG. 5, for example by approximately 20°. The second direction extends in the exemplary embodiment shown parallel with respect to the z-axis, that is to say by way of example spatially vertically. The second direction will therefore be referred to below for short, for the sake of simplicity, as the "direction of the z-axis".

A field of view 52 of the laser scanner 12 is defined by its extent in the direction of the z-axis, which is referred to in the present case as the vertical field of view 54, and its extent in the direction of the y-axis, which is referred to in the present case as the horizontal field of view 56. The horizontal field of view 56 of the laser scanner 12 is defined by the opening angle 46 of the first beam influencing device 42. The vertical field of view 54 is defined by the expansion angle 50 of the cylindrical lens 44. Overall, the laser scanner 12 in the exemplary embodiment shown thus has a field of view 52 with a spatial opening angle of 150°×20°.

Figure 6:
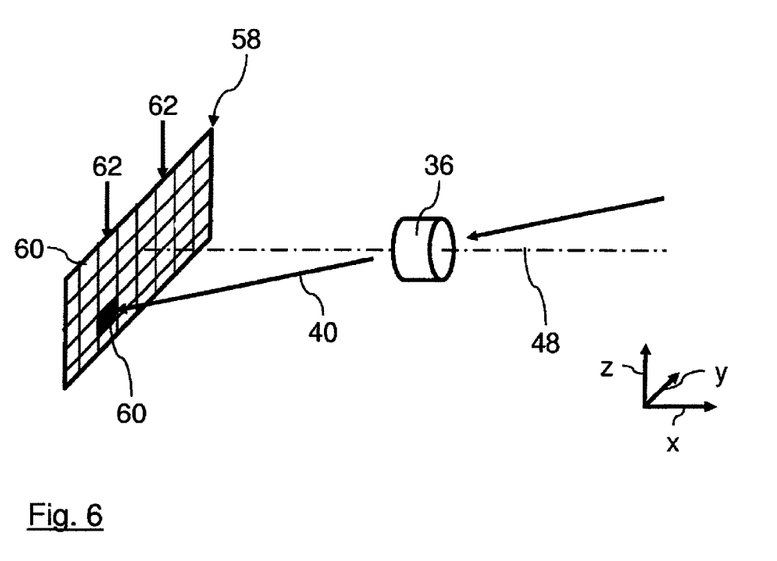
FIG. 6 schematically shows an isometric illustration of a receiver of the laser scanner of the motor vehicle from FIGS. 1 and 2.

The receiver 34 comprises a two-dimensional spatially resolved radiation sensor 58, indicated in FIG. 6, for example a CCD array. The radiation sensor 58 has a multiplicity of two-dimensionally arranged reception image points 60, which can also be referred to as "pixels". By way of example, the receiver 34 can have 200 image point columns 62, located one next to the other as viewed in the direction of the y-axis, each having a multiplicity of image points 60. FIG. 6 indicates, for better clarity, only eight image point columns 62 in each case having five image points 60. The image points 60 of each image point column 62 are here arranged next to one another as viewed in the z-direction, that is to say for example spatially on top of one another.

During operation of the laser scanner 12, the transmitter 30 emits pulsed transmission signals 38, which are input into the first beam influencing device 42.

The first beam influencing device 42 is used to scan the horizontal field of view 56 in correspondence with the transmitter 30 in the direction of the y-axis in 1500 scanning steps with a resolution of 0.1°. In this way, an opening angle 46 in the direction of the y-axis of for example approximately 150° is covered.

Each transmitted transmission signal 38 is expanded using the cylindrical lens 44 in the direction of the z-axis. In each scanning step, the entire vertical field of view 54 is illuminated in the direction of the z-axis with the corresponding light pulse of the transmission signal 38. In this way, the monitoring region 14 in the field of view 52 is scanned overall with the expansion angle 50 of 20° in the direction of the z-axis and the opening angle 46 of 150° in the direction of the y-axis.

The receiver optical unit 36 of the receiver 34 is used to direct the reception signals 40 reflected by the object 18 onto the radiation sensor 58. A direction of the object 18 relative to the laser scanner 12 is ascertained from a deflection angle 64 of the first beam influencing device 42, which is determined for example in FIG. 4 starting from an external delimitation of the horizontal field of view 56, and a position of the illuminated image point 60 of the radiation sensor 58 on the radiation sensor 58. The distance of the object 18 from the laser scanner 12 is ascertained from the time of flight. In this way, the exact position of the object 18 relative to the laser scanner 12 can be determined.

Is not essential for the invention whether electrical control and/or evaluation devices, such as for example the control device 24, the control and evaluation device 28, an engine control device or the like, of the motor vehicle 10 are integrated in one or more structural elements or realized at least partially as decentralized structural elements.

The invention claimed is:

1. An optical transmission and receiving device of an optical detection apparatus of a vehicle, comprising:
    at least one optical transmitter for transmitting at least one transmission light beam;
    at least one scanning unit at least for changing the beam direction of the at least one transmission light beam; and
    at least one optical receiver for receiving at least one reception light beam,
    which are arranged relative to one another such that the at least one receiver receives transmission light beams, which have been transmitted by the at least one optical transmitter and are reflected back by an object or obstacle which may be present in a transmission beam path of the at least one transmitter as reception light beams,
    wherein the at least one scanning unit comprises:
        at least one first beam influencing device for deflecting at least one transmission light beam, which has been radiated into the at least one scanning unit by the at least one transmitter, in a first direction, and
        at least one second beam influencing device for changing a beam propagation of the at least one transmission light beam in a second direction,
        wherein the at least one second beam influencing device is arranged in the beam path of the at least one transmission light beam downstream of the at least one first beam influencing device,
        wherein the first direction and the second direction extend perpendicularly or at an angle with respect to one another,
        wherein the at least one second beam influencing device has at least one cylindrical lens for expanding the at least one transmission light beam in the second direction, and
        wherein the at least one first beam influencing device has at least one electro-optical light refraction device.

2. The transmission and receiving device according to claim 1, wherein the transmission and receiving device has at least one angle-resolving and/or spatially resolving optical receiver.

* * * * *